US009057466B2

(12) United States Patent
Dowe et al.

(10) Patent No.: US 9,057,466 B2
(45) Date of Patent: Jun. 16, 2015

(54) USE OF A COMPOSITION FOR CONTACT WITH SUPERCRITICAL MEDIA

(75) Inventors: Andreas Dowe, Borken (DE); Reinhard Beuth, Marl (DE); Franz-Erich Baumann, Duelmen (DE)

(73) Assignee: Evonik Degussa GmbH, Essen (DE)

( * ) Notice: Subject to any disclaimer, the term of this patent is extended or adjusted under 35 U.S.C. 154(b) by 882 days.

(21) Appl. No.: 13/128,297

(22) PCT Filed: Oct. 7, 2009

(86) PCT No.: PCT/EP2009/063025
§ 371 (c)(1),
(2), (4) Date: May 9, 2011

(87) PCT Pub. No.: WO2010/063506
PCT Pub. Date: Jun. 10, 2010

(65) Prior Publication Data
US 2011/0209768 A1    Sep. 1, 2011

(30) Foreign Application Priority Data
Dec. 1, 2008    (DE) .................. 10 2008 044 224

(51) Int. Cl.
B29C 47/88   (2006.01)
F16L 11/08   (2006.01)
C08L 77/00   (2006.01)
C08L 77/06   (2006.01)
C08L 77/12   (2006.01)
F16L 9/147   (2006.01)
F16L 11/06   (2006.01)

(52) U.S. Cl.
CPC ............... *F16L 11/083* (2013.01); *C08L 77/00* (2013.01); *C08L 77/06* (2013.01); *C08L 77/12* (2013.01); *C08L 2205/02* (2013.01); *F16L 9/147* (2013.01); *F16L 11/06* (2013.01)

(58) Field of Classification Search
USPC .............. 264/211.13, 36.15, 36.16, 241, 269, 264/270, 632, 512, 171.12, 177.14, 209.1, 264/171.23, 171.28, 172.18, 173.14, 264/173.12, 173.19
See application file for complete search history.

(56) References Cited

U.S. PATENT DOCUMENTS

| 4,866,127 | A |   | 9/1989 | Jacquemin et al. |
| 4,950,436 | A |   | 8/1990 | Kitami et al. |
| 5,006,602 | A |   | 4/1991 | Guerin et al. |
| 5,019,189 | A | * | 5/1991 | Kumura et al. ............... 428/586 |
| 5,055,197 | A | * | 10/1991 | Albright et al. .............. 210/638 |
| 5,643,526 | A |   | 7/1997 | Hert et al. |
| 5,662,975 | A |   | 9/1997 | Hert et al. |
| 5,998,545 | A |   | 12/1999 | Melot et al. |
| 6,203,920 | B1 |   | 3/2001 | Bouilloux et al. |
| 6,530,420 | B1 | * | 3/2003 | Takada et al. ............ 165/104.33 |
| 6,884,485 | B2 |   | 4/2005 | Baumann et al. |
| 7,582,342 | B2 |   | 9/2009 | Baumann et al. |
| 2002/0147272 | A1 |   | 10/2002 | Lee et al. |
| 2003/0162899 | A1 | * | 8/2003 | Baumann et al. .............. 525/178 |
| 2004/0013878 | A1 |   | 1/2004 | Honma et al. |
| 2004/0052997 | A1 | * | 3/2004 | Santo ........................... 428/36.3 |
| 2005/0014842 | A1 | * | 1/2005 | Baumann et al. .............. 514/622 |
| 2005/0038201 | A1 |   | 2/2005 | Wursche et al. |
| 2005/0165175 | A1 |   | 7/2005 | Montanari et al. |
| 2006/0182916 | A1 |   | 8/2006 | Dowe et al. |
| 2006/0183869 | A1 |   | 8/2006 | Dowe et al. |
| 2007/0036998 | A1 |   | 2/2007 | Dowe et al. |
| 2008/0182945 | A1 |   | 7/2008 | Malet et al. |
| 2010/0009106 | A1 |   | 1/2010 | Dowe et al. |
| 2010/0183837 | A1 | * | 7/2010 | Hochstetter et al. ........ 428/36.91 |
| 2010/0300572 | A1 |   | 12/2010 | Dowe et al. |
| 2010/0300573 | A1 | * | 12/2010 | Dowe et al. .................... 138/145 |
| 2011/0209768 | A1 |   | 9/2011 | Dowe et al. |
| 2012/0000541 | A1 |   | 1/2012 | Dowe et al. |
| 2012/0006465 | A1 |   | 1/2012 | Dowe et al. |
| 2012/0199317 | A1 |   | 8/2012 | Hartmann et al. |
| 2012/0275774 | A1 |   | 11/2012 | Goering et al. |
| 2012/0279577 | A1 |   | 11/2012 | Goering et al. |

FOREIGN PATENT DOCUMENTS

| DE | 39 14 011 | 11/1989 |
| DE | 44 08 042 | 9/1995 |
| DE | 101 62 968 | 7/2002 |

(Continued)

OTHER PUBLICATIONS

International Search Report issued May 11, 2010 in PCT/EP09/063025 filed Oct. 7, 2009.
U.S. Appl. No. 13/063,134, filed Mar. 9, 2011, Dowe, et al.
U.S. Appl. No. 13/729,280, filed Dec. 28, 2012, Pawlik, et al.
U.S. Appl. No. 13/640,552, filed Oct. 11, 2012, Kuhmann, et al.
U.S. Appl. No. 13/639,765, filed Oct. 5, 2012, Kuhmann, et al.
U.S. Appl. No. 13/640,679, filed Oct. 11, 2012, Kuhmann, et al.
U.S. Appl. No. 13/640,586, filed Oct. 11, 2012, Kuhmann, et al.
U.S. Appl. No. 14/224,807, filed Mar. 25, 2014, Franosch, et al.
U.S. Appl. No. 14/225,842, filed Mar. 26, 2014, Dowe, et al.

*Primary Examiner* — Stella Yi
(74) *Attorney, Agent, or Firm* — Oblon, Spivak, McClelland, Maier & Neustadt, L.L.P.

(57) ABSTRACT

A molding composition which comprises at least 50% by weight of the following constituents:
a) from 0 to 99 parts by weight of polyamide, and
b) from 1 to 100 parts by weight of polyamide elastomer, selected from the group of polyetheresteramide and polyetheramide,
where the total of the parts by weight is 100 and where the molding composition comprises from 0 to 9% by weight of plasticizer,
is used for the production of a molding for contact with a supercritical medium, and preferably for the production of an inner thermoplastics layer in a flexible pipe or rigid pipe, in which a supercritical medium is conveyed. Low or zero plasticizer content eliminates any significant occurrence of problems such as increased stiffness and longitudinal shrinkage.

15 Claims, No Drawings

(56) References Cited

FOREIGN PATENT DOCUMENTS

| | | |
|---|---|---|
| DE | 10 2006 038108 | 2/2008 |
| EP | 0 855 431 | 7/1998 |
| EP | 1 300 620 | 4/2003 |
| EP | 1 717 022 | 11/2006 |
| FR | 2 590 586 | 5/1987 |
| FR | 2 592 655 | 7/1987 |
| WO | 2006 108959 | 10/2006 |
| WO | 2008 122743 | 10/2008 |

* cited by examiner

USE OF A COMPOSITION FOR CONTACT WITH SUPERCRITICAL MEDIA

The present invention relates to the use of a polyamide moulding composition for contact with supercritical media, in particular when it is used in a flexible pipe or in a rigid pipe, as material for a layer which comes into contact with the supercritical medium conveyed. These are primarily flexible pipes or rigid pipes for the conveying of oil, natural gas or supercritical media, such as $CO_2$, or for transporting these together. Flexible pipes or rigid pipes of this type can be laid under water, e.g. off-shore, or else on land.

There are various types of submarine lines. Firstly, there are lines of this type which can either be sunk at large submarine depths or else, if appropriate, laid in shallow water, these being used for conveying crude oil or crude gas or any other such fluid from a collection point to a delivery point. Secondly, lines of this type are used to provide a connection between the sea bed, which is the location of the well head, and the surface, where there is generally an oil platform or gas platform installed for production and onward transport. It is known that there are two broad classes into which these types of lines are divided: namely rigid pipes and flexible pipes. The former are normally produced from steel, and in some instances can have a coating of concrete or can have a thermoplastic inliner to protect the steel from corrosion. They can be laid in very deep water. Flexible pipes are normally composed of a number of layers of thermoplastic materials and reinforcing materials, such as steel braids or plastics composites.

In a typical flexible pipe of this type, which is well known, fluid to be conveyed flows through an inner cross section which can be formed by a core layer, which is often termed a carcass. The inner surface of the said core layer delimits the inner cross section, while the external surface must be rendered impermeable with respect to penetration by the fluid flowing through within the inner cross section. There is therefore a layer formed on the external surface of the carcass to prevent passage of the conveyed fluid. A barrier polymer layer is used for this purpose. This layer also inhibits ingress of external water and the like, which could otherwise contaminate the fluid conveyed. A polyamide (PA) is generally used for this barrier layer; in particular, a plasticized PA11 or PA12 is often used. One embodiment extrudes the barrier layer onto an internal carcass. Within the multilayer flexible pipe, there are further layers arranged towards the outside, examples being a set of layers composed of reinforcing tapes, and an external protective sheath. To prevent wear between two steel-tape layers, "antiwear tapes" are arranged between these. These tapes generally use a polyamide; a plasticized PA11 is particularly frequently used here. The internal structure of flexible pipes of this type is described by way of example in WO 2006/097678A1.

A problem with flexible pipes of this type, inter alia, is that they have to have the flexibility necessary to permit the flexible pipe to be unrolled and then laid, and also to bend under the conditions prevailing at the usage location, without failure. A particular problem arising here is that the materials of the individual layers in this type of flexible pipe have to be selected in such a way as to give the desired level of flexibility. The flexible pipes have to have high resistance to temperature changes and corrosion, thus giving a service time of more than 20 years and in some cases more than 25 years, and this also applies to rigid pipes.

New developments, such as improved oil recovery, require that the rigid or flexible pipes or their layers or their inliners are compatible with supercritical media, for example supercritical $CO_2$. Supercritical media such as $CO_2$ are a very good extraction medium, and the plasticized polyamide moulding compositions usually used are therefore unsuitable under these conditions. The polyamide layer loses its high flexibility because of extraction of the plasticizer used in the polyamide moulding composition, and it exhibits a certain degree of shrinkage. The reduced flexibility is disadvantageous for the performance described above as required from a flexible pipe, and the shrinkage of the polyamide layer causes longitudinal shrinkage, and the result of this can be problems at the end connectors and terminal seals, an example being contraction or fracture of the polymer layer. The shrinkage of the barrier can also create a gap in relation to the closest surrounding exterior layers. This can reduce the resistance of the carcass to collapse, thus restricting the maximum installation depth of this type of flexible pipe. Secondly, if an inliner composed of a plasticized polyamide moulding composition has been close-fit-installed within a rigid pipeline, the shrinkage can cause loss of this close contact. The result is a movable inliner which then takes the stress caused by the longitudinal shrinkage of the inliner and transfers it to the end connectors.

The object of the present invention consists in eliminating the said disadvantages and providing a polyamide moulding composition for example for the production of flexible pipes and for inliners of rigid pipelines, where these firstly have the good mechanical properties of the polyamide-based materials usually used and secondly also have good compatibility with supercritical media, for example supercritical $CO_2$. Compatibility here means the substantial retention of the properties, in particular of flexibility, and the retention of dimension, despite exposure to an extractant medium.

These objects, and other objects discernible from the application documents, are achieved via the use of a mould composition for the production of a moulding which is used for contact with a supercritical medium, where the moulding composition comprises at least 50% by weight, preferably at least 60% by weight, particularly preferably at least 70% by weight and with particular preference at least 80% by weight, of the following constituents:
  a) from 0 to 99 parts by weight, preferably from 4 to 96 parts by weight, particularly preferably from 10 to 90 parts by weight, with particular preference from 20 to 85 parts by weight and very particularly preferably from 30 to 80 parts by weight or from 40 to 75 parts by weight, of polyamide, and
  b) from 1 to 100 parts by weight, preferably from 4 to 96 parts by weight, particularly preferably from 10 to 90 parts by weight, with particular preference from 15 to 80 parts by weight, and very particularly preferably from 20 to 70 parts by weight or from 25 to 60 parts by weight, of polyamide elastomer, selected from the group of polyetheresteramide, polyetheramide and mixtures thereof, where the total of the parts by weight is 100 and where the moulding composition comprises from 0 to 9% by weight of plasticizer.

In one preferred embodiment, the said moulding composition is used as inner thermoplastics layer in a flexible pipe or rigid pipe used for the conveying of a supercritical medium. The said inner thermoplastics layer is in contact with the conveyed medium.

The external diameter of the flexible pipes of the type described above, used according to the invention, is preferably from 30 to 850 mm, particularly preferably from 32 to 750 mm and with particular preference from 50 to 650 mm, while the external diameter of the rigid pipes used according to the invention is preferably from 30 to 1100 mm, particularly preferably from 32 to 1000 mm, with particular preference from 50 to 900 mm and very particularly preferably from 50 to 700 mm.

The polyamide can be produced from a combination of diamine and dicarboxylic acid, from an ω-aminocarboxylic acid or from the corresponding lactam. In principle it is possible to use any polyamide, for example PA46, PA6, PA66 or copolyamides on the said basis having units derived from terephthalic acid and/or from isophthalic acid (generally termed PPA). In one preferred embodiment, the monomer units contain an average of at least 8, at least 9, or at least 10, carbon atoms. In the case of mixtures of lactams, it is the arithmetic average that is considered here. In the case of a combination of diamine and dicarboxylic acid, the arithmetic average of the number of carbon atoms of diamine and dicarboxylic acid must be at least 8, at least 9, or at least 10 in the said preferred embodiment. Examples of suitable polyamides are: PA610 (which can be produced from hexamethylenediamine [6 carbon atoms] and sebacic acid [10 carbon atoms], the average number of carbon atoms in the monomer units here therefore being 8), PA88 (which can be produced from octamethylenediamine and 1,8-octanedioic acid), PA8 (which can be produced from caprylolactam), PA612, PA810, PA108, PA9, PA613, PA614, PA812, PA128, PA 1010, PA10, PA814, PA148, PA1012, PA11, PA1014, PA1212 and PA12. The production of the polyamides is prior art. It is, of course, also possible to use copolyamides based thereon, and it is also possible here, if appropriate, to use monomers such as caprolactam concomitantly.

It is also possible to use mixtures of various polyamides, with the precondition of sufficient compatibility. Compatible polyamide combinations are known to the person skilled in the art; the combination PA12/PA1012, PA12/PA1212, PA612/PA12, PA613/PA12, PA1014/PA12 and PA610/PA12, and corresponding blends with PA11 may be listed by way of example here. In case of doubt, routine experiments can be used to determine compatible combinations.

Polyetheresteramides are known by way of example from DE-A-25 23 991 and DE-A-27 12 987; they contain a polyetherdiol as comonomer. Polyetheramides are known by way of example from DE-A-30 06 961; they contain a polyetherdiamine as comonomer.

The polyether unit in the polyetherdiol or in the polyetherdiamine can be based, for example, on 1,2-ethanediol, 1,2-propanediol, 1,3-propanediol, 1,4-butanediol or 1,3-butanediol. The polyether unit can also be of mixed structure, for example having random or blockwise distribution of the units deriving from the diols. The weight-average molar mass of the polyetherdiols or polyetherdiamines is from 200 to 5000 g/mol and preferably from 400 to 3000 g/mol; their proportion, based on the polyetheresteramide or polyetheramide, is preferably from 4 to 60% by weight, and particularly preferably from 10 to 50% by weight. Suitable polyetherdiamines are accessible via conversion of the corresponding polyetherdiols through reductive amination or coupling onto acrylonitrile with subsequent hydrogenation; they are commercially available, for example, in the form of JEFFAMIN® D or ED grades, or of the ELASTAMINE® grades from Huntsman Corp., or in the form of the polyetheramine D product group from BASF SE. It is also possible to use relatively small amounts of a polyethertriamine concomitantly, an example being a JEFFAMIN® T grade, if the intention is to use a branched polyetheramide. It is preferable to use polyetherdiamines and, respectively, polyethertriamines which contain, per ether-oxygen atom, an average of at least 2.3 carbon atoms in the chain.

The moulding composition can comprise further components alongside polyamide and polyamide elastomer, examples being impact modifiers, other thermoplastics and other conventional additives. The only requirement is that the polyamide forms the matrix of the moulding composition.

Examples of suitable impact modifiers are ethylene/α-olefin copolymers, preferably selected from a) ethylene/$C_3$-$C_{12}$ α-olefin copolymers having from 20 to 96% by weight, preferably from 25 to 85% by weight, of ethylene. An example of a $C_3$-$C_{12}$ α-olefin used is propene, 1-butene, 1-pentene, 1-hexene, 1-octene, 1-decene or 1-dodecene. Typical examples of these are ethylene-propylene rubber and LLDPE and VLDPE.

b) Ethylene/$C_3$-$C_{12}$ α-olefin/unconjugated diene terpolymers having from 20 to 96% by weight, preferably from 25 to 85% by weight, of ethylene, and up to a maximum of about 10% by c) weight of an unconjugated diene such as bicyclo[2.2.1] heptadiene, 1,4-hexadiene, dicyclopentadiene or 5-ethylidenenorbornene. Again, suitable examples of $C_3$-$C_{12}$ α-olefin are propene, 1-butene, 1-pentene, 1-hexene, 1-octene, 1-decene or 1-dodecene.

The production of the said copolymers or terpolymers, for example with the aid of a Ziegler-Natta catalyst, is prior art.

Other suitable impact modifiers are styrene-ethylene/butylene block copolymers. Here, it is preferable to use styrene-ethylene/butylene-styrene block copolymers (SEBS), these being obtainable via hydrogenation styrene-butadiene-styrene block copolymers. However, it is also possible to use diblock systems (SEB) or multiblock systems. Block copolymers of this type are prior art.

These impact modifiers preferably contain anhydride groups, which are introduced in a known manner via thermal or free-radical reaction of the main-chain polymer with an unsaturated dicarboxylic anhydride, or with an unsaturated dicarboxylic acid or with a monoalkyl ester of an unsaturated dicarboxylic acid, at a concentration sufficient for good linkage to the polyamide. Examples of suitable reagents are maleic acid, maleic anhydride, monobutyl maleate, fumaric acid, citraconic anhydride, aconitic acid or itaconic anhydride. This method preferably gives grafting of from 0.1 to 4% by weight of an unsaturated anhydride onto the impact modifier. According to the prior art, it is also possible that the unsaturated dicarboxylic anhydride or its precursor is grafted-on together with another unsaturated monomer, for example styrene, α-methylstyrene or indene.

Other suitable impact modifiers are copolymers which contain units of the following monomers:

a) from 20 to 94.5% by weight of one or more α-olefins having from 2 to 12 carbon atoms, b) from 5 to 79.5% by weight of one or more acrylic compounds, selected from
  acrylic acid or methacrylic acid or salts thereof,
  esters of acrylic acid or methacrylic acid with a C1-C12 alcohol, where these may, if appropriate, bear a free hydroxy or epoxy function,
  acrylonitrile or methacrylonitrile,
  acrylamides or methacrylamides, c) from 0.5 to 50% by weight of an olefinically unsaturated epoxide, carboxylic anhydride, carboximide, oxazoline or oxazinone.

The said copolymer is by way of example composed of the following monomers, but this list is not exhaustive:

a) α-olefins, such as ethylene, propene, 1-butene, 1-pentene, 1-hexene, 1-octene, 1-decene or 1-dodecene;

b) acrylic acid, methacrylic acid or salts thereof, for example with $Na^{\oplus}$ or $Zn^{2\oplus}$ as counterion; methyl acrylate, ethyl acrylate, n-propyl acrylate, n-butyl acrylate, isobutyl acrylate, n-hexyl acrylate, n-octyl acrylate, 2-ethylhexyl acrylate, isononyl acrylate, dodecyl acrylate, methyl methacrylate, ethyl methacrylate, n-propyl methacrylate, n-butyl methacrylate, isobutyl methacrylate, 2-ethylhexyl methacrylate, hydroxyethyl acrylate, 4-hydroxybutyl methacrylate, glycidyl acrylate, glycidyl methacrylate, acrylonitrile, methacrylonitrile, acrylamide, N-methyl acrylamide, N,N-dimethylacrylamide, N-ethylacrylamide, N-hydroxyethylacrylamide, N-propylacrylamide, N-butylacrylamide, N-(2-ethylhexyl)acrylamide, methacrylamide, N-methylmethacrylamide, N,N-dimethylmethacrylamide, N-ethylmethacrylamide, N-hydroxyethylmethacrylamide, N-propylmethacrylamide, N-butylmethacrylamide, N,N-dibutylmethacrylamide, N-(2-ethylhexyl) methacrylamide;

c) vinyloxirane, allyloxirane, glycidyl acrylate, glycidyl methacrylate, maleic anhydride, aconitic anhydride, itaconic anhydride, and also the dicarboxylic acids produced from the said anhydrides via reaction with water; maleimide, N-methylmaleimide, N-ethylmaleimide, N-butylmaleimide, N-phenylmaleimide, aconitimide, N-methylaconitimide, N-phenylaconitimide, itaconimide, N-methylitaconimide, N-phenylitaconimide, N-acryloylcaprolactam, N-methacryloylcaprolactam, N-acryloyllaurolactam, N-methacryloyllaurolactam, vinyloxazoline, isopropenyloxazoline, allyloxazoline, vinyloxazinone or isopropenyloxazinone.

If glycidyl acrylate or glycidyl methacrylate is used, these simultaneously also function as acrylic compound b), and therefore, given an adequate amount of the glycidyl (meth) acrylate, there is no need for the presence of any further acrylic compound. In this specific embodiment, the copolymer contains units of the following monomers:

a) from 20 to 94.5% by weight of one or more α-olefins having from 2 to 12 carbon atoms,
b) from 0 to 79.5% by weight of one or more acrylic compounds, selected from
   acrylic acid or methacrylic acid or salts thereof,
   esters of acrylic acid or methacrylic acid with a $C_1$-$C_{12}$ alcohol,
   acrylonitrile or methacrylonitrile,
   acrylamides or methacrylamides
c) from 0.5 to 80% by weight of an ester of acrylic acid or methacrylic acid, where the ester contains an epoxy group, where the entirety of b) and c) gives at least 5.5% by weight.

The copolymer can contain small amounts of other copolymerized monomers, as long as these do not significantly impair properties, examples being dimethyl maleate, dibutyl fumarate, diethyl itaconate or styrene.

The production of the said copolymers is prior art. There is a wide variety of various grades thereof available commercially, for example as LOTADER® (Arkema; ethylene/acrylate/tercomponent or ethylene/glycidyl methacrylate).

Another impact modifier component that can also be used is nitrile rubber (NBR) or hydrogenated nitrile rubber (HNBR), where these, if appropriate, contain functional groups. Corresponding moulding compositions are described in US2003/0220449A1.

Other thermoplastics which can be present in the moulding composition are mainly polyolefins. In one embodiment, as described at an earlier stage above for the case of the impact modifiers, they can contain anhydride groups and then, if appropriate, can be present together with an unfunctionalized impact modifier. In another embodiment, they are unfunctionalized and are present in the moulding composition in combination with a functionalized impact modifier or with a functionalized polyolefin. The term "functionalized" means that the polymers according to the prior art have been provided with groups which can react with the end groups of the polyamide, examples being anhydride groups, carboxy groups, epoxy groups or oxazoline groups.

The polyolefin is by way of example polyethylene or polypropylene. In principle it is possible to use any commercially available grade. Examples of those that can be used are therefore: high-, medium- or low-density linear polyethylene, LDPE, ethylene-acrylate copolymers, ethylene-vinyl acetate copolymers, isotactic or atactic homopolypropylene, random copolymers of propene with ethene and/or 1-butene, ethylene-propylene block copolymers and the like. The polyolefin can be produced by any known process, for example by the Ziegler-Natta process, by the Phillips process, or by means of metallocenes or by a free-radical route. In this instance, the polyamide can also be, for example, PA6 and/or PA66.

The moulding composition can also comprise conventional amounts of additives needed to adjust certain properties. Examples of these are pigments or fillers such as carbon black, titanium dioxide, zinc sulphide, silicates or carbonates, reinforcing fibres such as glass fibres, processing aids such as waxes, zinc stearate or calcium stearate, flame retardant such as magnesium hydroxide, aluminium hydroxide or melamine cyanurate, antioxidants, UV stabilizers, and additions which give the product antielectrostatic properties or electrical conductivity, examples being carbon fibres, graphite fibrils, or fibres composed of stainless steel, or conductive carbon blacks.

In one preferred embodiment, the moulding composition comprises no plasticizer. However, small amounts of plasticizer can be tolerated. In one possible embodiment, the moulding composition accordingly comprises from 0.1 to 9% by weight, preferably from 0.1 to 7% by weight, particularly preferably from 0.1 to 5% by weight, with particular preference from 0.1 to 4% by weight and with very particular preference from 0.1 to 3% by weight, of plasticizer. At more than 9% by weight of plasticizer, problems such as increased rigidity and longitudinal shrinkage occur to a significant extent.

Plasticizers and their use in polyamides are known. A general overview of plasticizers suitable for polyamides can be found in Gächter/Müller, Kunststoffadditive [Plastics additives], C. Hanser Verlag, 2nd Edition, p. 296.

Examples of conventional compounds suitable as plasticizer are esters of p-hydroxybenzoic acid having from 2 to 20 carbon atoms in the alcohol component, or amides of arylsulphonic acids having from 2 to 12 carbon atoms in the amine component, preferably amides of benzenesulphonic acid. Plasticizers that can be used, inter alia, are ethyl p-hydroxybenzoate, octyl p-hydroxybenzoate, isohexadecyl p-hydroxybenzoate, N-n-octyltoluenesulphonamide, N-n-butylbenzenesulphonamide or N-2-ethylhexylbenzenesulphonamide.

In another preferred embodiment, residual monomers present, and oligomers, such as dimers and trimers, are removed by means of known extractants from the polyamide prior to the compounding process. Examples of known extractants are methanol and ethanol, and also supercritical gases, e.g. carbon dioxide. The result is that in the subsequent application in contact with supercritical media there are no remaining extractable residual monomers and extractable residual oligomers available for extraction, and this contributes to the dimensional stability of the polyamide layer.

High melt stiffness is desirable during the extrusion of the moulding composition to form the thermoplastics layer. High melt stiffness is generally attended by high molecular weight of the polyamide and high melt viscosity.

One known process for the production of these polyamides is solid-phase post-condensation of pelletized low-viscosity polyamides to give high-viscosity polyamide at a temperature lower than the melting point. This process is described by way of example in CH 359 286, and in U.S. Pat. No. 3,821,171. The solid-phase post-condensation of polyamides is normally carried out in a dryer operating batchwise or continuously under an inert gas or in vacuo. This method permits the production of polyamides with very high molecular weight.

Another possibility for the production of high-viscosity polyamides is continuous post-condensation in the melt, using various types of screw apparatuses.

WO 2006/079890 states that high-viscosity polyamide moulding compositions can be obtained via mixing of a high-molecular-weight polyamide and of a low-molecular-weight polyamide.

Another possible route to high-viscosity polyamides or high-viscosity polyamide moulding compositions uses additives that increase molecular weight; suitable additives or processes are described by way of example in the following specifications: WO 98/47940, WO 96/34909, WO 01/66633, WO 03/066704, JP-A-01/197526, JP-A-01/236238, DE-B-24 58 733, EP-A-1 329 481, EP-A-1 518 901, EP-A-1 512 710, EP-A-1 690 889, EP-A-1 690 890 and WO 00/66650.

However, extrusion of the moulding compositions produced according to the said prior art generally requires high current consumption or very high torque, with very high pressure at the die. Furthermore, the high shear forces result in appreciable chain cleavage, thus reducing molecular weight during processing.

For these reasons, for the purposes of the invention, it is preferable that the condensation process to increase the molecular weight of the polyamide-containing moulding composition, with the aid of an additive that increases molecular weight, is delayed until the processing procedure has begun. The invention therefore also provides the use according to the claims of a polyamide-containing moulding composition where the inner thermoplastics layer of a flexible pipe or rigid pipe has been produced from the moulding composition by means of the following steps in a process:
a) a moulding composition has been provided;
b) a premix has been produced from the moulding composition and from an additive that increases molecular weight, for example a compound having at least two carbonate units,
c) the mixture has, if appropriate, been stored and/or transported;
d) the mixture has been mixed in the melt, with shear, and the condensation process to increase molecular weight did not begin before this step was reached;
e) the mixture of melts has been extruded and solidified.

It has been established that, given this mode of addition during processing, a significant increase in melt stiffness occurs, while the load on the motor is simultaneously low. It is therefore possible, despite high melt viscosity, to achieve high processing throughputs, the result of this being an improvement in the cost-effectiveness of the production process. The process is described by way of example below for the case where the additive that increases molecular weight is a compound having at least two carbonate units.

The molecular weight $M_n$ of the starting polyamide is preferably greater than 5000, in particular greater than 8000. Polyamides used here are those whose end groups at least to some extent take the form of amino groups. By way of example, at least 30%, at least 40%, at least 50%, at least 60%, at least 70%, at least 80% or at least 90%, of the end groups take the form of amino end groups. The production of polyamides having relatively high amino end group content, using diamines or polyamines as a regulator, is prior art. In the present instance, the production of the polyamide preferably uses an aliphatic, cycloaliphatic or araliphatic diamine having from 4 to 44 carbon atoms, as regulator. Examples of suitable diamines are hexamethylenediamine, decamethylenediamine, 2,2,4- or 2,4,4-trimethylhexamethylenediamine, dodecamethylenediamine, 1,4-diaminocyclohexane, 1,4- or 1,3-dimethylaminocyclohexane, 4,4'-diaminodicyclohexylmethane, 4,4'-diamino-3,3'-dimethyldicyclohexylmethane, 4,4'-diaminodicyclohexylpropane, isophoronediamine, metaxylylenediamine or paraxylylenediamine.

In another preferred embodiment, a polyamine is used as regulator and simultaneously as branching agent, during the production of the polyamide. Examples here are diethylenetriamine, 1,5-diamino-3-(β-aminoethyl)pentane, tris(2-aminoethyl)amine, N,N-bis(2-aminoethyl)-N',N'-bis[2-[bis(2-aminoethyl)amino]ethyl]-1,2-ethanediamine, dendrimers, and polyethyleneimines, in particular branched polyethyleneimines, which are obtainable via polymerization of aziridines (Houben-Weyl, Methoden der Organischen Chemie [Methods of organic chemistry], Volume E20, pages 1482-1487, Georg Thieme Verlag Stuttgart, 1987), and which generally have the following amino groups of distribution:
from 25 to 46% of primary amino groups,
from 30 to 45% of secondary amino groups and
from 16 to 40% of tertiary amino groups.

The compound having at least two carbonate units is used in a quantitative proportion of from 0.005 to 10% by weight, calculated as a ratio to the polyamide used. The said ratio is preferably in the range from 0.01 to 5.0% by weight, particularly preferably in the range from 0.05 to 3% by weight. The expression "carbonate" here means esters of carbolic acid in particular with phenols or with alcohols.

The compound having at least two carbonate units can be of low molecular weight, or oligomeric or polymeric. It can be composed entirely of carbonate units, or it can also have other units. These are preferably oligo- or polyamide units, oligo- or polyester units, oligo- or polyether units, oligo- or polyetheresteramide units or oligo- or polyetheramide units. These compounds can be produced via known oligo- or polymerization processes or by polymer-analogous reactions.

In one preferred embodiment, the compound having at least two carbonate units is a polycarbonate, for example one based on bisphenol A, or is a block copolymer which contains a polycarbonate block of this type.

When the compound used as additive and having at least two carbonate units is metered in in the form of a masterbatch, this permits more precise metering of the additive, since the amounts used are larger. It has moreover been found that the use of a masterbatch achieves improved extrudate quality. The masterbatch preferably encompasses, as matrix material, the polyamide whose molecular weight has also been increased by the condensation process according to the invention, or a polyamide compatible therewith, but under the reaction conditions it is also possible for partial linkage to occur between incompatible polyamides and the polyamide whose molecular weight is to be increased by a condensation process, and this results in compatibilization. The molecular weight $M_n$ of the polyamide used as matrix material in the masterbatch is preferably greater than 5000 and in particular greater than 8000. Preference is given here to those polyamides whose end groups mainly take the form of carboxylic acid groups. By way of example, at least 80%, at least 90% or at least 95% of the end groups take the form of acid groups.

However, instead of this it is also possible to use, as matrix material in the masterbatch, a polyetheramide having a high concentration of amino end groups. Surprisingly, the amino end groups of the polyetheramide are so unreactive as to undergo no significant reaction with the compound having at least two carbonate units. This method can be used to achieve improved hydrolysis resistance of the moulding.

The concentration of the compound having at least two carbonate units in the masterbatch is preferably from 0.15 to 50% by weight, particularly preferably from 0.2 to 25% by weight and with particular preference from 0.3 to 15% by weight. This type of masterbatch is produced in the usual manner known to the person skilled in the art.

Suitable compounds having at least two carbonate units, and suitable masterbatches, are described in detail in WO 00/66650, expressly included herein by way of reference.

The invention can be used in the case of polyamides which, as a result of the production process, comprise at least 5 ppm of phosphorus in the form of an acidic compound. In this instance, from 0.001 to 10% by weight, based on the polyamide, of a salt of a weak acid is added to the polyamide moulding composition prior to the compounding process or during the compounding process. DE-A 103 37 707 discloses suitable salts, and is hereby expressly incorporated herein by way of reference.

However, the invention has equally good applicability to polyamides which, as a result of the production process, comprise less than 5 ppm of phosphorus or no phosphorus in the form of an acidic compound. Although a corresponding salt of a weak acid can be added in this instance, it is not necessary to do so.

The compound having at least two carbonate units is added as it stands or in the form of a masterbatch, preferably not until after the compounding process, i.e. not until after the production of the polyamide moulding composition, but at the latest during processing. It is preferable that, during processing, the polyamide whose molecular weight is to be increased by a condensation process, or the polyamide moulding composition whose molecular weight is to be increased by a condensation process, is mixed in the form of pellets with the pellets or powder of the compound having at least two carbonate units, or with the corresponding masterbatch. However, it is also possible that a mixture of pellets of the finished compounded polyamide moulding composition with the compound having at least two carbonate units or with the masterbatch is produced, and then transported or stored and then processed. It is naturally also possible to operate correspondingly with powder mixtures. The decisive factor is that the mixture is not melted until processing has begun. Thorough mixing of the melt during processing is to be recommended. However, it is also equally possible that the masterbatch in the form of melt stream is added by metering with the aid of an ancillary extruder to the melt of the polyamide moulding composition to be processed, and then incorporated by thorough mixing.

Instead of the compound having at least two carbonate units, it is also possible to use any other suitable additive that increases molecular weight, an example being one disclosed in the abovementioned literature. Suitable qualitative proportions here are again from 0.005 to 10% by weight, calculated as a ratio to the polyamide used, preferably from 0.01 to 5.0% by weight, particularly preferably from 0.05 to 3% by weight.

Supercritical media are obtained when liquids or gases are heated above their critical pressure $P_c$ and above the critical temperature $T_c$. In the supercritical state, features of supercritical liquids, in comparison with genuine liquids, are not only lower density, and much lower viscosity and much higher diffusion coefficients, but also especially their excellent solvent power. The critical temperature $T_c$ of carbon dioxide is 31.0° C. and its critical pressure $P_c$ is 7.38 MPa. A more detailed description of supercritical media is found in Kirk-Othmer, Encyclopedia of Chemical Technology, 4th Edition, Volume 23, pp. 452-477.

Supercritical media which according to the invention come into contact with the polyamide moulding composition are not only $CO_2$ but also, for example, $H_2S$, $N_2$, $CH_4$, ethane, propane, butane, natural gas or mixtures thereof, this being a non-restrictive list.

The invention is used by way of example in oil recovery or in permanent underground storage of $CO_2$ in exhausted oil wells, gas wells and the like. Because the pressures and temperatures in wells are high, it is also possible that gases such as $CO_2$, $CH_4$ and $H_2S$ are found in the supercritical state in the well. By way of example, temperatures of 270° C. and pressures of 1700 bar can occur in deep oil wells or deep gas wells.

The lifetime of an oil well is quite restricted; oil supply from wells rarely lasts for ten years. If the natural productivity of a crude-oil well (primary production) falls, the yield can sometimes be improved by injecting natural gas or water (secondary production). However, the methods used in primary and secondary production remove only about 30% of the oil. To utilize the remainder—previously ignored—retained because of excessive viscosity and by the action of capillary forces, methods of tertiary production ("enhanced oil recovery") have to be used. There are various methods for this. The most familiar method is gas injection: here, a gas such as $CO_2$, natural gas or nitrogen is injected into the deposit, where it mixes in the supercritical state with the remaining crude oil and is then extracted together with this.

However, the invention is not restricted to these methods, but can be used anywhere where a moulding composed of a polyamide moulding composition comes into contact with a supercritical medium.

The invention claimed is:

1. A method of containing or directing flow of a supercritical medium, the method comprising:
   contacting a molding with a supercritical medium,
   wherein the molding has a molding composition which comprises at least 50% by weight of:
   (a) from 0 to 99 parts by weight of polyamide, and
   (b) from 1 to 100 parts by weight of at least one polyamide elastomer selected from the group consisting of a polyetheresteramide and a polyetheramide,
   wherein a total of the parts by weight is 100 and wherein the molding composition comprises at most 9% by weight of plasticizer, and
   wherein the supercritical medium further comprises at least one selected from the group consisting of $CO_2$, $H_2S$, $N_2$, $CH_4$, ethane, propane, butane, and natural gas,
   wherein the molding is at least one of a flexible pipe and a rigid pipe, and the contacting comprises conveying the supercritical medium through at least one of the flexible pipe and the rigid pipe, wherein the flexible pipe and the rigid pipe comprise the molding composition as an inner thermoplastic layer which is in contact with the supercritical medium during the contacting.

2. The method of claim 1, wherein the molding composition comprises no plasticizer.

3. The method of claim 1, wherein the flexible pipe is present and an external diameter of the flexible pipe is from 30 to 850 mm.

4. The method of claim 1, wherein the rigid pipe is present and an external diameter of the rigid pipe is from 30 to 1100 mm.

5. The method of claim 1, wherein at least one of the polyetheresteramide and the polyetheramide is present in (b) and a weight-average molar mass of a polyetherdiol present as comonomer in the polyetheresteramide and a weight-average molar mass of a polyetherdiamine present as comonomer in the polyetheramide is from 200 to 5000 g/mol, and a proportion of these, based on the polyetheresteramide and, respectively, polyetheramide, or mixture of these, is from 4 to 60% by weight.

6. The method of claim 1, wherein the inner thermoplastic layer has been produced from the molding composition by a process comprising:
(i) producing a mixture of a polyamide-comprising molding composition and of an additive that increases molecular weight;
(ii) optionally, storing, transporting, or storing and transporting the mixture;
(iii) mixing the mixture in a melt, with shear, and wherein a condensation process to increase molecular weight did not begin before the mixing (iii), to obtain a mixture of melts;
(iv) extruding and solidifying the mixture of melts.

7. The method of claim 5, wherein an additive that increases molecular weight is a compound comprising at least two carbonate units.

8. The method of claim 1, wherein, prior to a compounding process, the polyamide of (a) is extracted, in order to remove residual monomers and to remove oligomers.

9. The method of claim 1, wherein the supercritical medium has been mixed with crude oil.

10. The method of claim 1, wherein the supercritical medium is a component of tertiary production of crude oil or a component in permanent underground storage of $CO_2$.

11. The method of claim 1, wherein the contacting comprises flowing a liquid mixture comprising an oil and $CO_2$ through the molding, wherein the molding is in the form of a pipe and the $CO_2$ is in a supercritical state.

12. The method of claim 1, wherein the polyamide comprises no phosphorus in the form of an acidic compound.

13. The method of claim 1, wherein the molding composition comprises at most 3% by weight of plasticizer.

14. The method of claim 1, wherein the polyamide elastomer consists of units selected from the group consisting of ether units, ester units and amide units.

15. The method of claim 1, wherein the polyamide elastomer is present in an amount of from 1 to 4 parts by weight.

* * * * *